United States Patent
Fukano

[19]

[11] Patent Number: 6,002,666

[45] Date of Patent: Dec. 14, 1999

[54] TRAFFIC SHAPING APPARATUS WITH CONTENT ADDRESSABLE MEMORY

[75] Inventor: Maki Fukano, Tokyo, Japan

[73] Assignee: NEC Corporation, Tokyo, Japan

[21] Appl. No.: 08/888,692

[22] Filed: Jul. 7, 1997

[30] Foreign Application Priority Data

Jul. 5, 1996 [JP] Japan ................................. 8-195356

[51] Int. Cl.[6] .............................. H04L 12/50; H04L 12/56
[52] U.S. Cl. ........................ 370/229; 370/392; 370/395; 370/412
[58] Field of Search ..................... 370/230, 229, 370/232, 233, 234, 253, 357, 391, 395, 468, 412–420; 395/200.62–200.64; 709/200

[56] References Cited

U.S. PATENT DOCUMENTS

| | | | |
|---|---|---|---|
| 5,515,370 | 5/1996 | Rau ......................................... | 370/399 |
| 5,535,201 | 7/1996 | Zheng ..................................... | 370/231 |
| 5,640,389 | 6/1997 | Masaki et al. .......................... | 370/418 |
| 5,748,614 | 5/1998 | Wallmeier ............................... | 370/235 |
| 5,818,839 | 10/1998 | Sterne et al. ............................ | 370/391 |
| 5,875,173 | 2/1999 | Ohgane et al. .......................... | 370/230 |
| 5,875,174 | 2/1999 | Okazaki .................................. | 370/230 |
| 5,875,175 | 2/1999 | Sherer et al. ............................ | 370/230 |
| 5,886,981 | 3/1999 | Kamiya ................................... | 370/230 |

FOREIGN PATENT DOCUMENTS

| | | |
|---|---|---|
| 3-1633 | 1/1991 | Japan . |
| 5-122250 | 5/1993 | Japan . |
| 6-46076 | 2/1994 | Japan . |
| 6-276209 | 9/1994 | Japan . |
| 7-212367 | 8/1995 | Japan . |
| 8-79264 | 3/1996 | Japan . |
| 8-125668 | 5/1996 | Japan . |

*Primary Examiner*—Chau Nguyen
*Assistant Examiner*—Seema S. Rao
*Attorney, Agent, or Firm*—Foley & Lardner

[57] ABSTRACT

In traffic shaping apparatus including a plurality of cell buffers, a content addressable memory is provided to store times for addresses each designating one of the cell buffers, and a timer counter is provided to generate a time. When this time is transmitted to the content addressable memory, an address is read from the content addressable memory in accordance with this time, so that a cell output permission is given to one of the cell buffers.

5 Claims, 3 Drawing Sheets

TRAFFIC SHAPING APPARATUS WITH CONTENT ADDRESSABLE MEMORY

BACKGROUND OF THE INVENTION

1. Field of the Invention

The present invention relates to traffic shaping apparatus used in an aynchronous transfer mode (ATM) switch unit to suppress the rate of cells.

2. Description of the Related Art

In an ATM switching system, an ATM switching unit ha a plurality of cell input ports and cell output ports. Also, one traffic shaping unit is interposed between one of the cell input ports and the switching unit to control a cell rate of traffic in the ATM switching unit. Similarly, one traffic shaping unit is interposed between the switching unit and one of the cell output ports to control a cell rate of traffic from the ATM switching unit.

In a prior art traffic shaping apparatus (see JR-A-7-99494), a plurality of cell buffers and a plurality of shaping counters are provided for traffic classes, cell output ports, or virtual channels (VCs). The shaping counters generate cell output requesting signals each having definite time periods. Also, an output cell buffer selecting unit generates a cell output permission signal in accordance with the output requesting signals to select one of the cell buffers.

Thus, the prior art traffic shaping apparatus suppresses the increase of fluctuation of delay of transmission of cells. This will be explained later in detail.

In the prior art traffic shaping apparatus, however, since the shaping counters are provided for every output port, every traffic class and every virtual channel, the hardware is increased which increases the manufacturing cost.

SUMMARY OF THE INVENTION

It is an object of the present invention to reduce the hardware of traffic shaping apparatus.

According to the present invention, in traffic shaping apparatus including a plurality of cell buffers, a content addressable memory is provided to store times for addresses each designating one of the cell buffers, and a timer counter is provided to generate a time. When this time is transmitted to the content addressable memory, an address is read from the content addressable memory in accordance with this time, so that a cell output permission is given to one of the cell buffers.

Since the shaping counters of the prior art traffic shaping apparatus are unnecessary, the hardwave can be reduced.

BRIEF DESCRIPTION OF THE DRAWINGS

The present invention will be more clearly understood from the description as set forth below, with reference to the accompanying drawings, wherein.

DESCRIPTION OF THE PREFERRED EMBODIMENTS

Before the description of the preferred embodiment, a prior art traffic shaping apparatus (unit) will be explained with reference to FIGS. 1 and 2.

Figure 1:
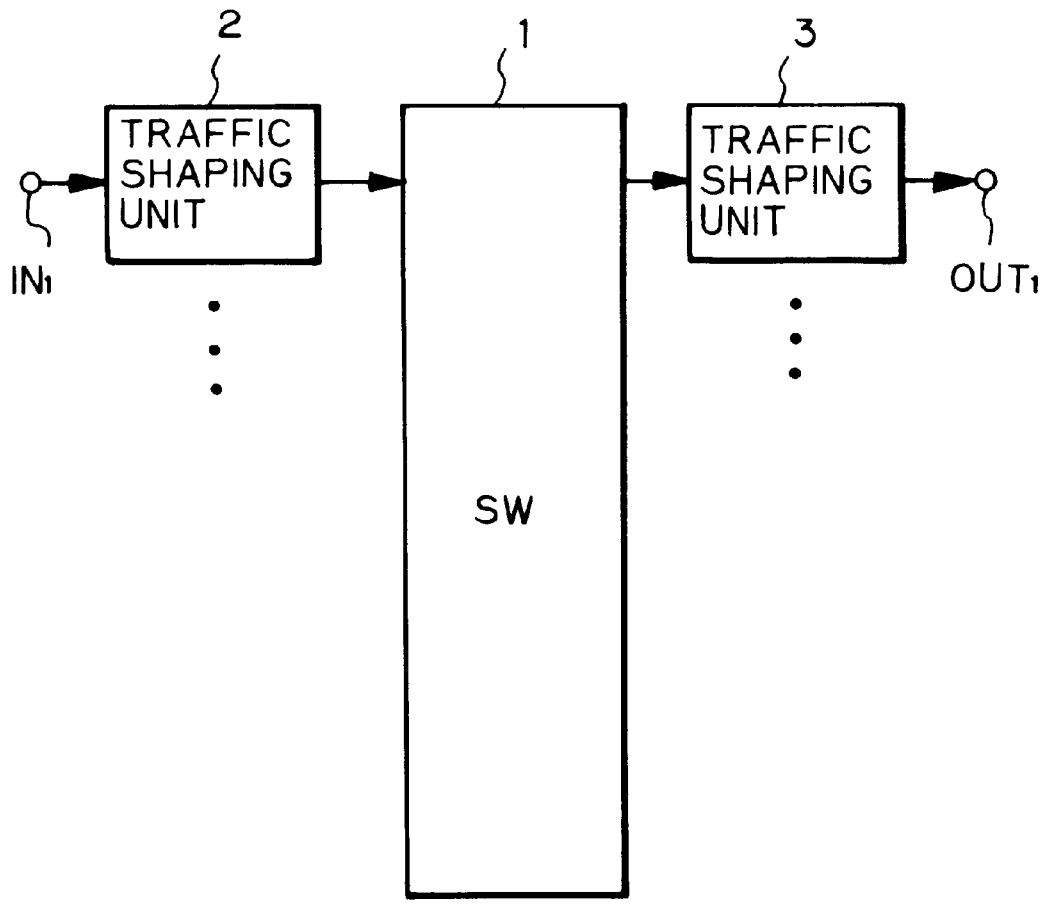
FIG. 1 is a block circuit illustrating a general ATM switching system.

In FIG. 1, which illustrates a general ATM switching system, reference numeral 1 designates an ATM switching unit having a plurality of cell input ports $IN_1, \ldots$, and cell output ports $OUT_1, \ldots$. Also, one traffic shaping unit 2 is interposed between one of the cell input ports $IN_1, \ldots$ and the switching unit 1 to control a cell rate of traffic from the cell input port such as $IN_1$ to the ATM switching unit 1. Similarly, one traffic shaping unit 3 is interposed between the switching unit 1 and one of the cell output ports $OUT_1$, ... to control a cell rate of traffic from the ATM switching unit 1 to the cell output port such as $OUT_1$. Note that the traffic shaping units 2 or the traffic shaping units 3 can be omitted, as occasion demands.

In FIG. 1, note that cells each having an ATM cell associated with an identifier (ID) are transmitted from the cell input ports $IN_1, \ldots$ via the ATM switch unit 1 to the cell output ports $OUT_1, \ldots$.

Figure 3:
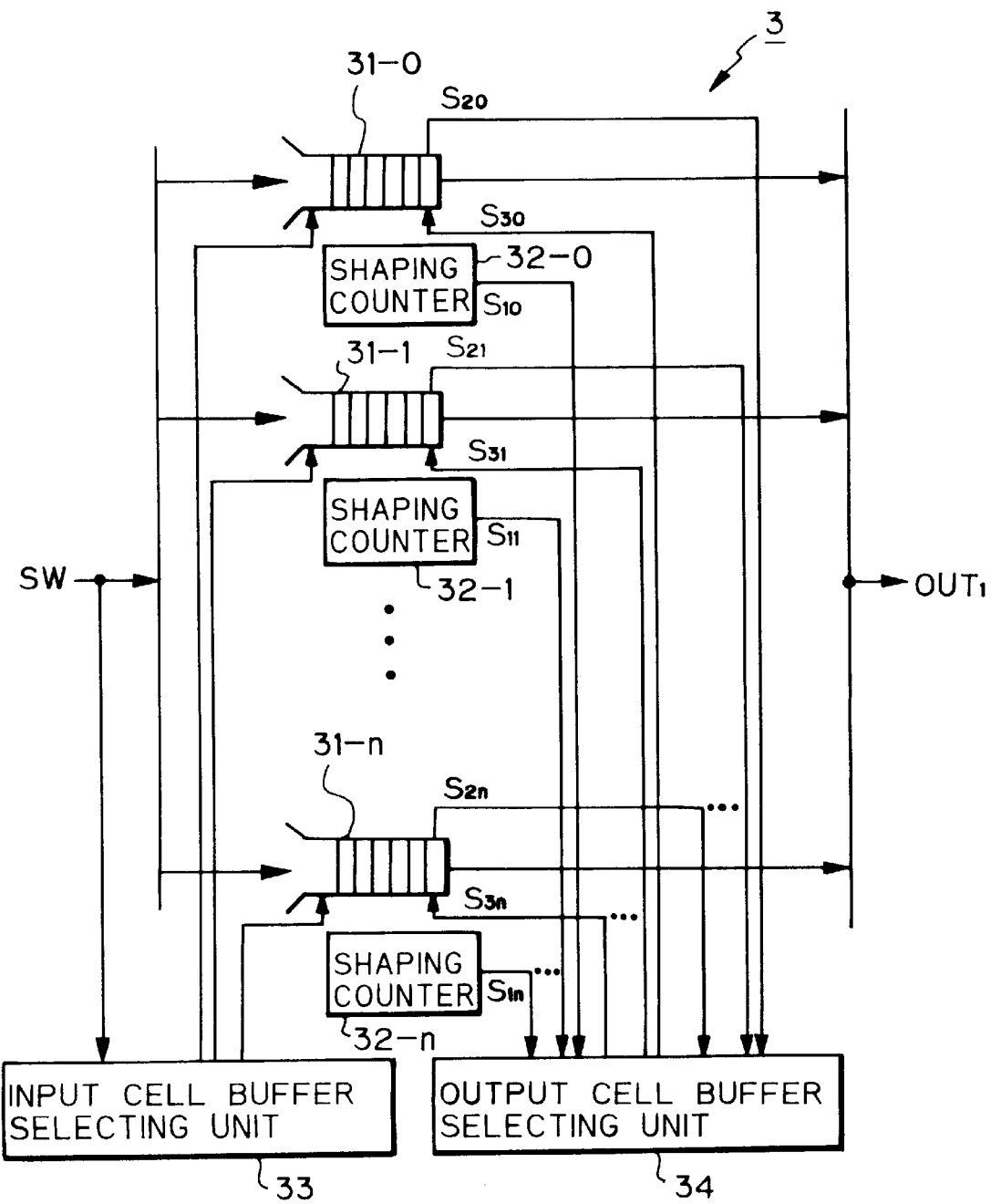
FIG. 3 is a block circuit diagram illustrating a prior art traffic shaping apparatus (unit)

In FIG. 3, which is a detailed circuit diagram of the traffic shaping unit such as 3 of FIG. 1 (see JP-A-7-99494), a plurality of cell buffers (FIFOs) 31-0, 31-1, ..., 31-n are provided, and a plurality of shaping counters 32-0, 32-1, ..., 32-n each associated with one of the cell buffers 31-0, 31-1, ..., 31-n are provided. The shaping counters 32-0, 32-1, ..., 32-n generate cell output requesting signals $S_{10}$, $S_{11}, \ldots, S_{1a}$, respectively, each having definite time periods.

Figure 2:
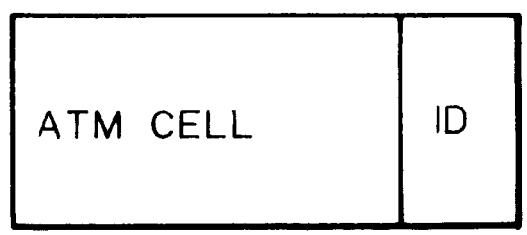
FIG. 2 is a format of a cell used in the system of FIG. 1.

Also, an input cell buffer selecting unit 33 reads the identifier of each cell as shown in FIG. 2, to select one of the cell buffers 31-0, 31-1, ..., 31-n. As a result, each cell is stored in one of the cell buffers 31-0, 31-1, ..., 31-n selected by the input cell buffer selecting unit 33. When at least one cell is stored in the cell buffer 31-0, 31-1, ..., or 31-n, the latter generates a non-empty signal $S_{20}, S_{21}, \ldots,$ or $S_{2n}$.

Further, an output cell buffer selecting unit 34 generates a cell output permission signal $S_{30}, S_{31}, \ldots,$ or $S_{3n}$ in accordance with the output requesting signals $S_{10}, S_{11}, \ldots, S_{1a}$ and the non-empty signals $S_{20}, S_{21}, \ldots, S_{2n}$ to select one of the cell buffers 31-0, 31-1, ..., 31-n. For example, when the cell output signal $S_{11}$ and the non-empty signal $S_{21}$ are generated, the output cell buffer selecting unit 34 generates the cell output permission signal $S_{31}$, so that a cell is output from the cell buffer 31-1.

Note that, if a plurality of the shaping counters generate output requesting signals, a cell output permission signal is given to one of the corresponding cell buffers which has the highest priority in accordance with a predetermined priority sequence. Otherwise, such a cell output permission signal is given to one of the corresponding buffers in accordance with a so-called round robin method.

Thus, the traffic shaping unit as illustrated in FIG. 3 suppresses the increase of fluctuation of delay of transmission of cells.

In FIG. 3, however, the cell buffers are provided for every output port, every traffic class and every virtual channel. Therefore, the shaping counters are also provided for every output port, every traffic class and every virtual channel, which increases the hardware and therefore, increases the manufacturing cost.

Figure 4:
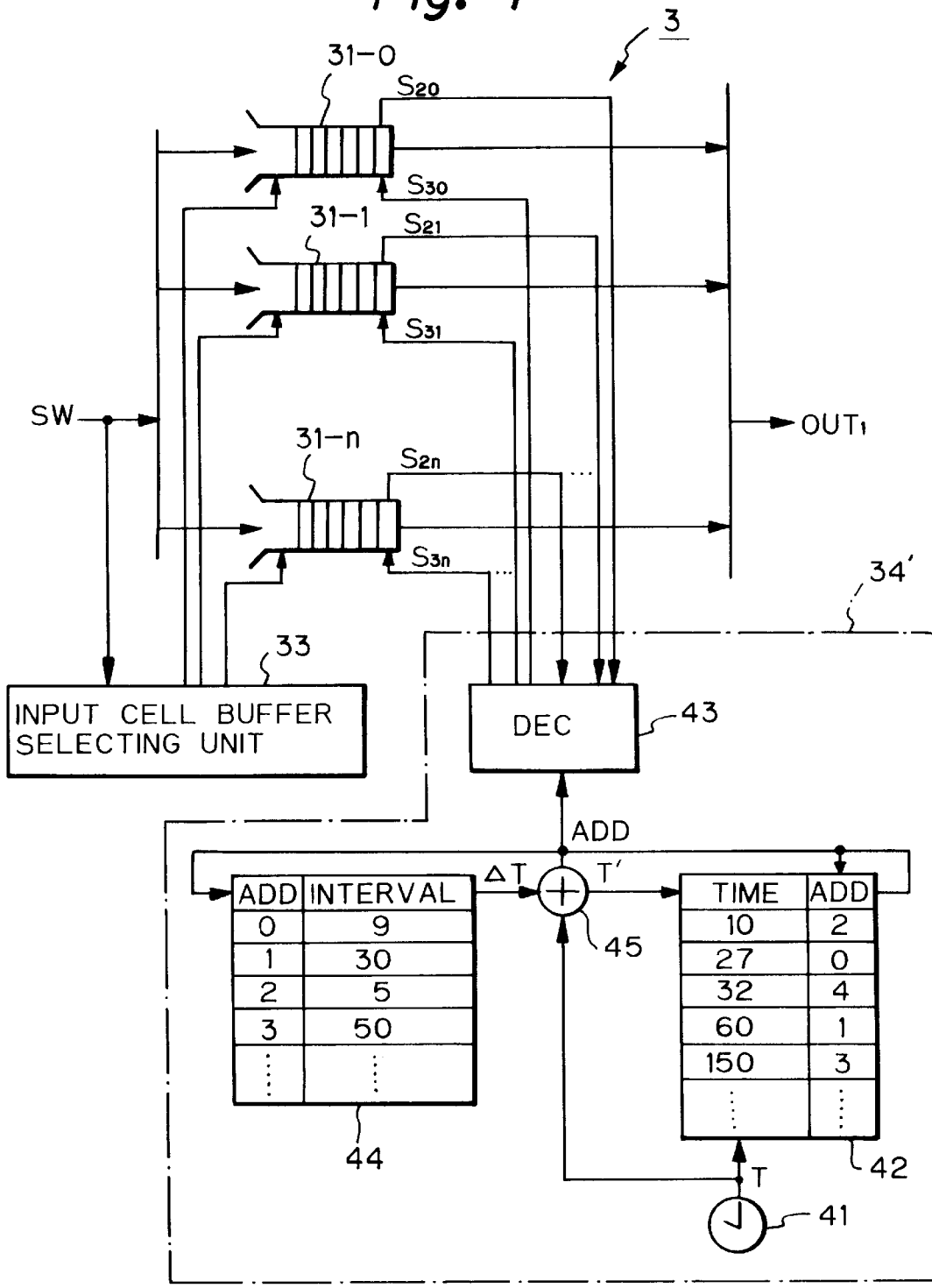
FIG. 4 is a block circuit diagram illustrating an embodiment of the traffic shaping apparatus (unit) according to the present invention.

In FIG. 4, which is an embodiment of the present invention, the shaping counters 32-0, 32-1, ..., 32-n of FIG. 3 are omitted, and the output cell buffer selecting unit 34 of FIG. 3 is modified into an output cell buffer selecting unit 34'.

The output cell buffer selecting unit 34' is formed by a timer counter 41 for generating a time T whose period corresponds to a maximum throughput of cells at the cell output port $OUT_1$. The time T of the timer counter 41 is supplied to an associative memory (content addressable memory) 42, to perform a read operation thereupon. In the content, addressable memory 42, time as data is written for an address ADD for designating one of the cell buffers 31-0, 31-1, . . . , 31-n. That is, if the address ADD of the content addressable memory 42 is "i", the cell buffer S1-i is designated. For example, in a read operation of the content addressable memory 42, when the time T of the timer counter 41 is 60, an address AND (=1) is read from the content addressable memory 42 and is transmitted to a decoder 43, so that the decoder 43 generates a cell output permission signal $S_{31}$. As a result, the cell buffer 31-1 outputs a first-in cell to the cell output port $OUT_1$. In this case, note that the decoder 43 generates the cell output permission signal $S_{31}$, only when non-empty signal $S_{21}$ is generated.

Simultaneously, the address ADD of the content addressable memory 42 is supplied to a time interval memory 44, and as a result, a read operation of the time interval memory 44 is initiated. In the time interval memory 44, a time interval ΔT as data is written in advance for each address ADD for designating one of the cell buffers 31-0, 31-1, . . . , 31-n. Therefore, in a read operation of the time interval memory 44, when the address ADD supplied to the time interval memory 44 is "1" a time interval ΔT (=30) is read from the time interval memory 44 and is transmitted to an adder 45. As a result, the adder 45 calculates a new time T' by $$T' = T + \Delta T$$
$$= 60 + 30$$
$$= 90$$

In addition, when the new time T' is supplied to the content addressable memory 42, a write operation of the content addressable memory 42 is initiated. That is, in the content addressable memory 42, the time T' is written into a location of the address ADD, so that the time T is renewed by the time T'.

The operations of the content addressable memory 42, the time interval memory 44, and the adder 45 are carried out every time the content of the timer counter 41 is counted up by +1. Also, even if the decoder 43 does not generate a cell output permission signal, the content of the content addressable memory 42 is renewed.

Thus, the cell buffers 31-0, 31-1, . . . , 31-n receive the cell output permission signals $S_{30}$, $S_{31}$, . . . , $S_{3a}$, respectively, in accordance with the time intervals stored in the time interval memory 44, and therefore, the cell rates of the cell buffers can be lower than different definite values.

As explained hereinabove, according to the present invention, even if the number of cell buffers is increased, other hardware of traffic shaping apparatus is hardly increased in size, the traffic shaping apparatus can be reduced in size.

I claim:

1. A traffic shaping apparatus comprising:

a plurality of cell buffers;

a content addressable memory for storing times for addresses each designating one of said cell buffers;

a timer counter, connected to said content addressable memory, for generating a time and transmitting said time to said content addressable memory, so that an address is read from said content addressable memory in accordance with said time generated from said time counter to give a cell output permission to one of said cell buffers;

a decoder, connected between said content addressable memory and said cell buffers, for decoding said address from said content addressable memory to generate a cell output permission signal for said one of said cell buffers;

a time interval memory, connected to said content addressable memory, for storing time intervals for said addresses; and an adder, connected to said timer counter, said time interval memory and said content addressable memory, for adding a time interval read from said time interval memory to said time generated from said timer counter to generate a new time, so that said new time is written into said content addressable memory in accordance with said address generated from said content addressable memory.

2. A traffic shaping apparatus used in an asynchronous transfer mode switch unit, comprising:

a plurality of cell buffers;

a content addressable memory for storing times for addresses each designating one of said cell buffers;

a timer counter, connected to said content addressable memory, for generating a time and transmitting said time to said content addressable memory, so that an address is read from said content addressable memory in accordance with said time generated from said time counter;

a decoder, connected between said content addressable memory and said cell buffers, for decoding said address from said content addressable memory to generate a cell output permission signal for one of said cell buffers;

a time interval memory, connected to said content addressable memory, for storing time intervals for said addresses; and an adder, connected to said timer counter, said time interval memory and said content addressable memory, for adding a time interval read from said time interval memory to said time generated from said timer counter to generate a new time, so that said new time is written into said content addressable memory in accordance with said address generated from said content addressable memory.

3. The apparatus as set forth in claim 2, wherein said cell buffers are allocated individually for traffic classes.

4. The apparatus as set forth in claim 2, wherein said cell buffers are allocated individually for output ports.

5. The apparatus as set forth in claim 2, wherein said cell buffers are allocated individually for virtual channels.

* * * * *